US012295465B2

(12) United States Patent
Bravo

(10) Patent No.: US 12,295,465 B2
(45) Date of Patent: May 13, 2025

(54) BRACELET CLASP

(71) Applicant: The Swatch Group Research and Development Ltd, Marin (CH)

(72) Inventor: Paulo Bravo, Marin-Epagnier (CH)

(73) Assignee: The Swatch Group Research and Development Ltd, Marin (CH)

( * ) Notice: Subject to any disclaimer, the term of this patent is extended or adjusted under 35 U.S.C. 154(b) by 181 days.

(21) Appl. No.: 17/684,832

(22) Filed: Mar. 2, 2022

(65) Prior Publication Data

US 2022/0338601 A1 Oct. 27, 2022

(30) Foreign Application Priority Data

Apr. 26, 2021 (EP) .................................... 21170450

(51) Int. Cl.

*A44C 5/20* (2006.01)
*A44B 11/00* (2006.01)
*G04B 37/14* (2006.01)

(52) U.S. Cl.

CPC .......... *A44C 5/2071* (2013.01); *A44B 11/006* (2013.01); *A44C 5/2052* (2013.01); *G04B 37/1486* (2013.01)

(58) Field of Classification Search

CPC .... A44C 5/2071; A44C 5/2052; A44C 5/2066
USPC .................................................... 24/265 WS
See application file for complete search history.

(56) References Cited

U.S. PATENT DOCUMENTS

| | | | | |
|---|---|---|---|---|
| 1,543,399 A * | 6/1925 | Smith | A44C 5/2071 2/322 |
| 4,534,090 A * | 8/1985 | Skobel | A44C 5/2052 24/615 |
| 6,530,133 B2 * | 3/2003 | Meyrat | A44C 5/2066 24/615 |
| 2017/0215530 A1 | 8/2017 | Grifoni | |
| 2021/0307460 A1 * | 10/2021 | Amano | A44C 5/2071 |

FOREIGN PATENT DOCUMENTS

| | | | | |
|---|---|---|---|---|
| CH | 712430 A2 * | 11/2017 | B22F 7/06 |
| CN | 211581798 U | 9/2020 | |
| EP | 0005855 A2 * | 12/1979 | |
| EP | 0005855 A3 | 12/1979 | |
| JP | 61-190209 U | 11/1986 | |
| JP | 62-37888 A | 2/1987 | |
| JP | 2019209122 A * | 12/2019 | A44C 11/00 |

OTHER PUBLICATIONS

Office Action issued Apr. 25, 2023 in Japanese Application No. 2022-025597.
European Search Report of No. 21170450.7 dated Oct. 11, 2021.

* cited by examiner

*Primary Examiner* — Scott T McNurlen
(74) *Attorney, Agent, or Firm* — Sughrue Mion, PLLC

(57) ABSTRACT

A bracelet clasp (1) including a strip (2), a first end (20) whereof is hinged to a first end (30) of a first bracelet strand (3), and the second end (21) of the strip (2) is free, said strip (2) having a cut-out (5) forming at least a rigid portion (22) and two opposing deformable portions (23, 24), each including a hook (6, 6') arranged to engage with a hole (40) in a second bracelet strand (4) and to lock the clasp on said second strand (4), simultaneous pressures exerted on the deformable portions (23, 24) resulting in the unlocking of the clasp.

15 Claims, 4 Drawing Sheets

BRACELET CLASP

CROSS REFERENCE TO RELATED APPLICATIONS

This application is claiming priority based on European Patent Application No. 21170450.7 filed on Apr. 26, 2021, the disclosure of which is incorporated herein in its entirely by reference.

FIELD OF THE INVENTION

The invention relates to a bracelet clasp, and in particular to watch bracelets or straps.

BACKGROUND OF THE INVENTION

The European patent No. 0 913 106 discloses an unfolding clasp comprising a rigid base provided with two side members, a cover arranged to be attached to a strand of the bracelet, and at least one unfolding arm having a rear end attached to one end of the base by a first hinge and having a front end attached to the cover by a second hinge. The folding arm includes two juxtaposed branches provided with push-pieces, the front ends whereof are held apart by a resilient element. Such a clasp has many parts, the assembly whereof is time-consuming and complicated, and has a high manufacturing cost. Moreover, such a clasp is not easy to handle as a result of the number of parts used.

SUMMARY OF THE INVENTION

One purpose of the present invention is to overcome some or all of the aforementioned drawbacks by providing a clasp that is simple and inexpensive to manufacture.

For this purpose, the invention relates to a bracelet clasp. As a result of these features, such a bracelet clasp offers an extremely simple design, is easy to handle, and consists of a single part.

According to other advantageous alternative embodiments of the invention:

- the strip comprises a loop for guiding the second bracelet strand, the loop being placed in the immediate vicinity of the free end of the strip;
- the strip comprises machined edges to form push-pieces and facilitate the deformation of the deformable portions;
- the rigid portion of the strip comprises a pin arranged to engage with a further hole in the second strand;
- the strip is made of a material selected from: plastic materials, metals and metal alloys, and composite materials;
- the strip is made of two materials from the aforementioned materials;
- the strip comprises protruding edges arranged to guide the second bracelet strand, said protruding edges being positioned in the vicinity of the first end of the strip.

The invention further relates to a wristwatch including a bracelet provided with a clasp in accordance with the invention.

BRIEF DESCRIPTION OF THE DRAWINGS

Other features and advantages of the invention will be better understood upon reading the following description given of a non-limiting specific embodiment of the invention, provided for illustration purposes with reference to the accompanying figures, in which.

DETAILED DESCRIPTION OF THE PREFERRED EMBODIMENTS

A clasp for a bracelet will now be described hereinbelow with joint reference to FIGS. 1, 2, 3 and 4.

Figure 1:
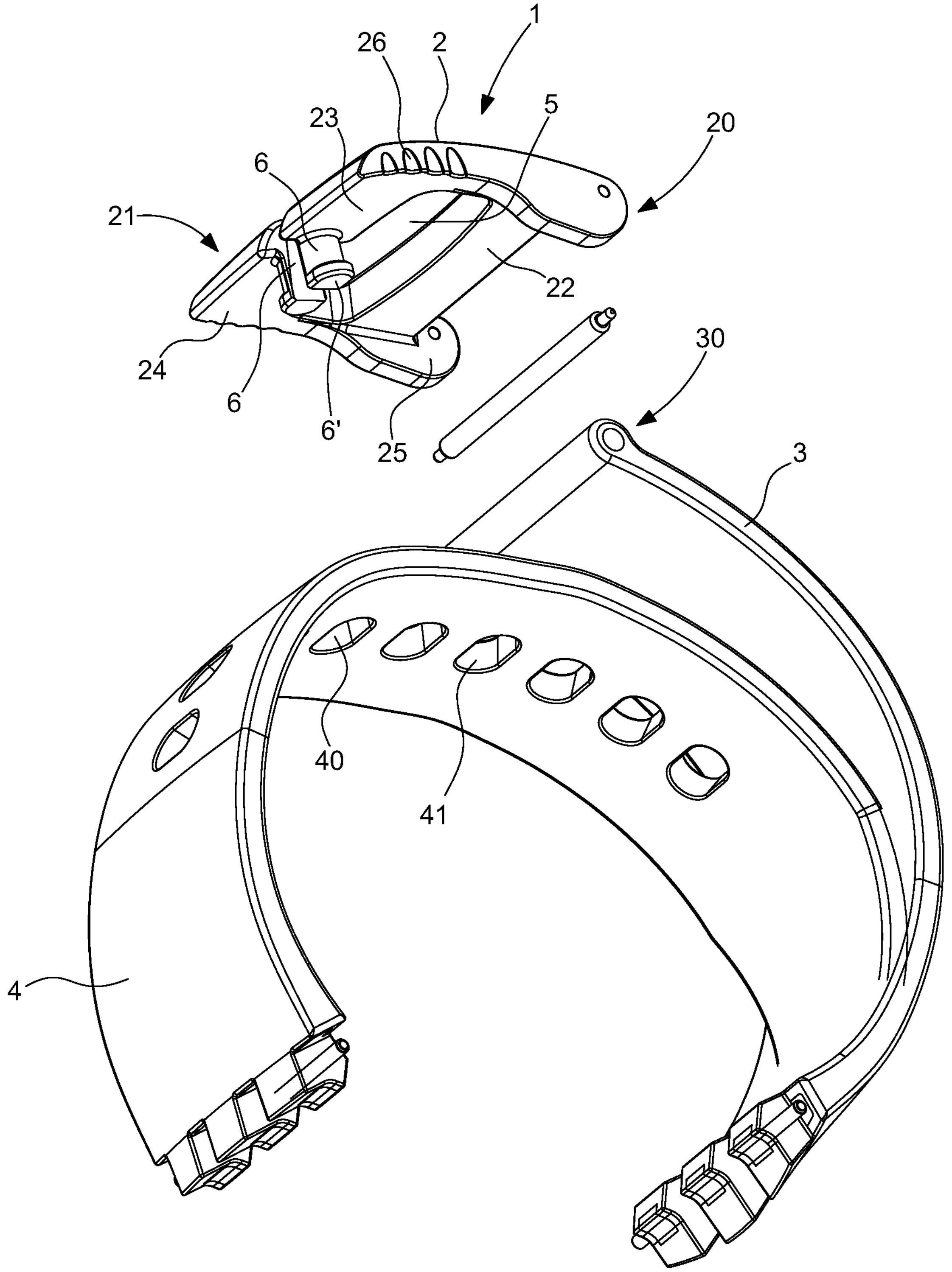
FIG. 1 is a perspective view of a clasp according to a first embodiment of the invention.

As shown in FIG. 1, the clasp 1 comprises a strip 2, a first end 20 whereof is hinged to a first end 30 of a first bracelet strand 3 via an arbor or a shaft passing through the strand, and the second end 21 of the strip 2 is free. According to yet another alternative embodiment, the strip can be clipped onto the strand via pins integral with the strip, the pins being formed at the same time as the strip during the manufacture thereof. The strip and the first strand 3 could also conceivably be formed at the same time, using different materials via a bi-injection method, and form one and the same piece.

As shown in FIG. 1, the first end 20 can have cut-outs to receive cylindrical portions of the end 30 of the first bracelet strand 3. Such a construction allows for a stronger and more rigid hinge.

According to the invention, said strip 2 comprises a cut-out 5 so as to form at least one rigid portion 22, located in the vicinity of the first end 20, and two opposite deformable portions 23, 24 located in the vicinity of the free end 21. The cut-out can take different shapes, such as a T or Y shape for example, or a logo shape.

As shown in FIG. 1, the two deformable portions each comprise, on the side facing the bracelet strand or on the bottom side, a pin 6 provided with a hook 6' arranged to engage with a hole 40 in a second bracelet strand 4 and to lock the clasp on the second strand 4. The height of the pin 6 is designed to be slightly greater than the thickness of the bracelet strand so that the hook 6' rests against the surface of the second strand 4 when the clasp is in the locked position. Similarly, the distance separating the two pins 6 is equivalent to the width of the hole 40 in the second strand 4 so that the clasp provides a good hold and lock once the hooks 6' are in position. The pins 6 and the hooks 6' thus form a locking mechanism arranged to hold the clasp with the second strand 4 when the watch is being worn.

Advantageously, the strip 2, the pins 6 and the hooks 6' form an element that is made in one piece.

Figure 2:
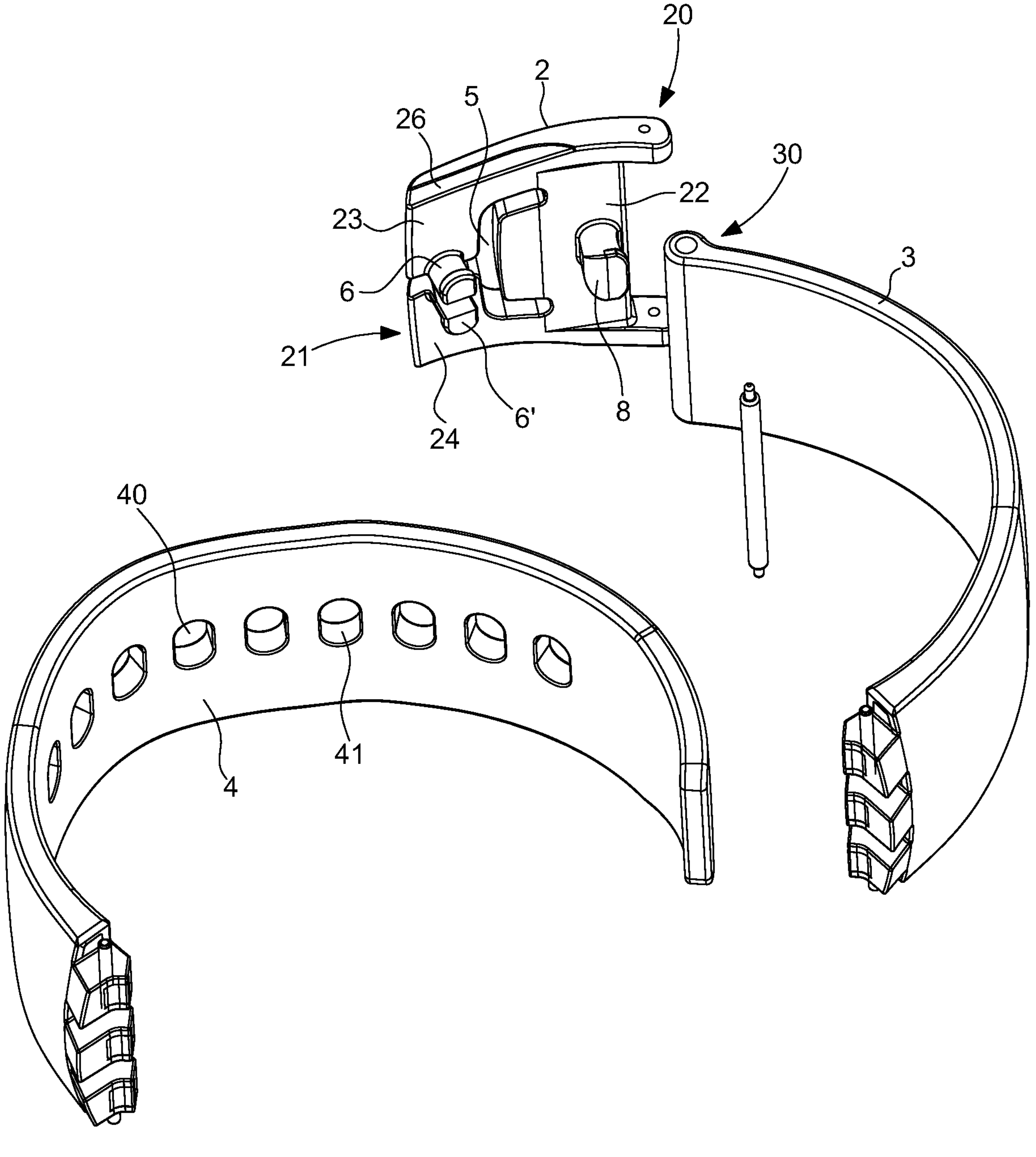
FIG. 2 is a perspective view of a clasp according to a second embodiment of the invention.

The strip 2 can have additional means for holding the second bracelet strand, such as a peg 8 as shown in FIG. 2 so as to provide an additional holding point for the second bracelet strand. Advantageously, this peg 8 can also be used as an aid for positioning the clasp on the second bracelet strand. The peg 8 is disposed on the bottom side of the rigid portion of the strip 2 and is arranged to engage with an additional hole 41 in the second strand 4.

The peg 8 thus acts as a safety device preventing the second strand 4 of the strip 2 from being unhooked, leading to the unexpected unlocking of the clasp in the event of an impact for example. Advantageously, the peg 8 is formed at the same time as the strip so that the assembly forms a one-piece element.

The deformable portions 23 and 24 of the strip 2 have machined edges to form push-pieces 26 and facilitate the gripping of the clasp for the deformation of the deformable portions.

According to one embodiment of the invention, the strip 2 comprises protruding edges 25 arranged to guide the second bracelet strand 4, the protruding edges 25 being positioned in the vicinity of the first end 20 of the strip 2, and oriented facing the bracelet strands.

Figure 3:
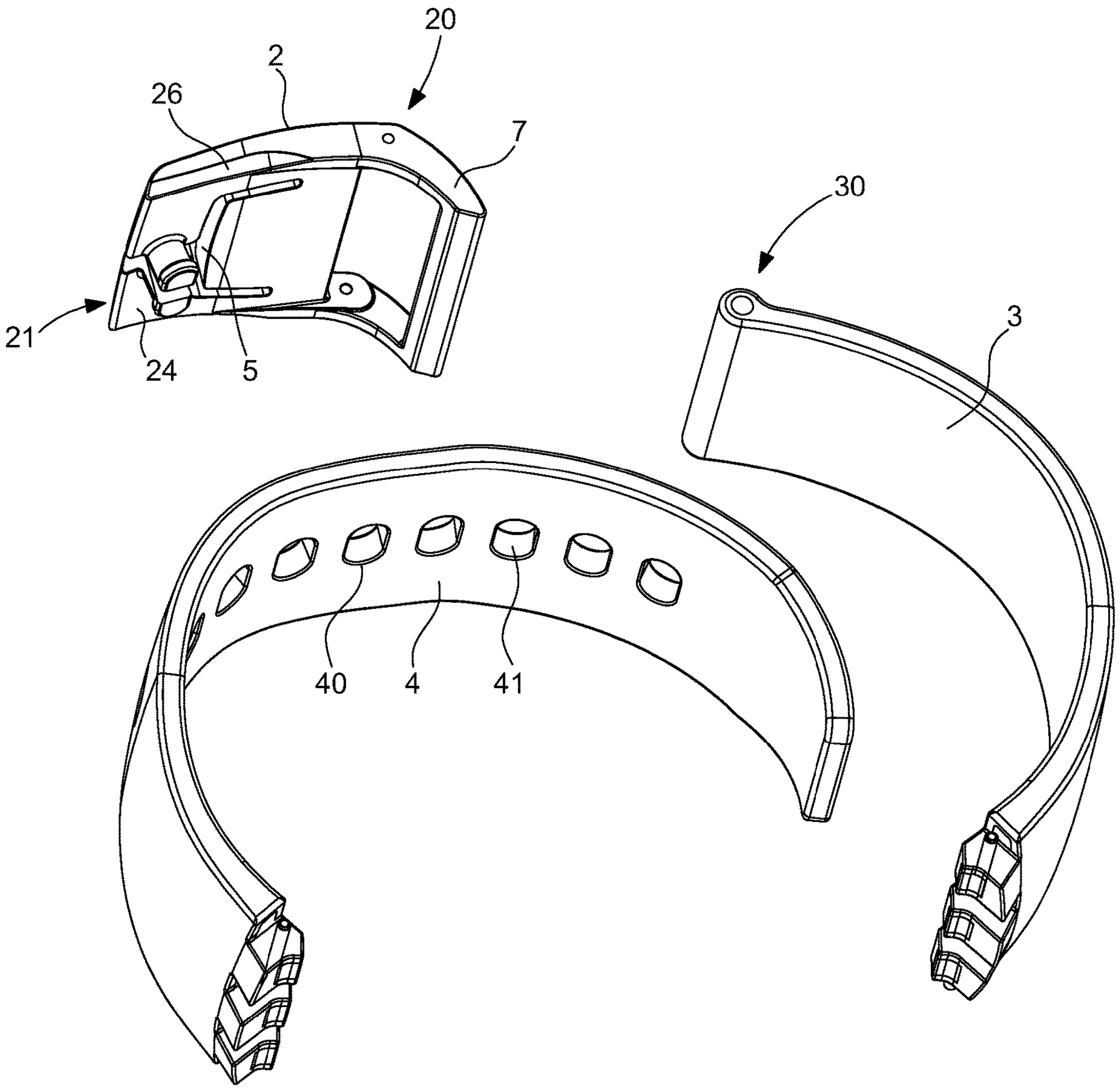
FIGS. 3 and 4 are perspective views of a clasp according to a third embodiment of the invention.
Figure 4:
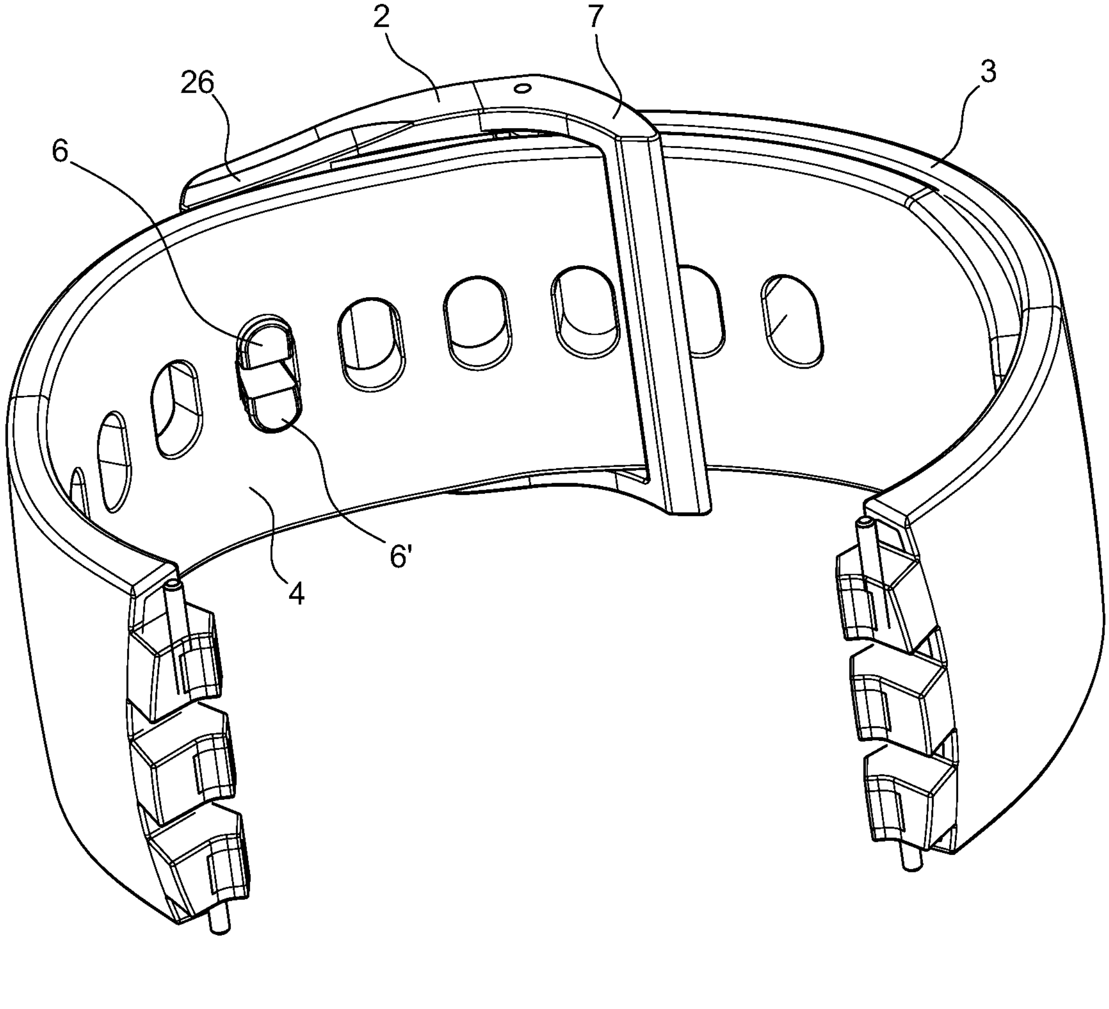

According to another embodiment of the invention, shown in FIGS. 3 and 4, the strip 2 comprises a loop 7 for guiding the second bracelet strand 4, the loop 7 being placed in the immediate vicinity of the first end 20 which is hinged to the first end 30 of the first bracelet strand 3, the second bracelet strand 4 passing beneath the first strand 3 and then through the loop 7.

The strip 2 of the clasp 1 is made of a material selected from: plastic materials, metals and metal alloys, and composite materials, via moulding, injection, machining, stamping, 3D printing, or a combination of these methods. A strip can also be made of two materials. The strip 2 can, for example, be made of plastic material and metal, for example the deformable portions can be made of plastic material and the remainder can be made of metal.

According to yet another embodiment (not shown in the figures), the second bracelet strand comprises locking means arranged to engage with said strip.

The positioning of the clasp and how it is released from the second strand 4 will now be described.

In FIG. 3, pressure is applied simultaneously to the push-pieces 26 to move the deformable portions 23, 24 and thus reduce the distance separating the pins and bring them closer together before inserting them into a hole 40 in the second bracelet strand 4.

The pins 6 are inserted into the hole 40 until the hooks 6' protrude from the hole 40. The wearer can then release pressure on the push-pieces 26, which causes the deformable portions 23, 24 to return to the rest position and consequently the hooks also to engage with the second bracelet strand, which causes the clasp to lock on the second bracelet strand.

To open the clasp, simultaneous pressure must be exerted on the push-pieces 26 to cause the hooks 6' to be released from the hole 40 and the clasp to open.

It goes without saying that the present invention is not limited to the example shown but that various alternatives and modifications that may be apparent to a person skilled in the art can be made thereto.

The invention claimed is:

1. A bracelet clasp comprising a strip, a first end whereof is hinged to a first end of a first bracelet strand, and the second end of the strip is free, said strip having a cut-out forming at least a rigid portion and two opposing deformable portions, each comprising a hook arranged to engage with each of a plurality of holes in a second bracelet strand and to lock the clasp on said second strand, simultaneous pressures exerted on the deformable portions resulting in the unlocking of the clasp, wherein the rigid portion of the strip comprises a pin arranged to engage with a further hole in the second strand.

2. The bracelet clasp according to claim 1, wherein the strip comprises a loop for guiding the second bracelet strand, the loop being placed in the immediate vicinity of the free end of the strip.

3. The bracelet clasp according to claim 1, wherein the strip comprises machined edges to form push-pieces and facilitate the deformation of the deformable portions.

4. The bracelet clasp according to claim 1, wherein the strip is made of a material selected from: plastic materials, metals and metal alloys, bioceramics, and composite materials.

5. The bracelet clasp according to claim 4, wherein the strip is made of two materials selected from: plastic materials, metals and metal alloys, bioceramics, and composite materials.

6. The bracelet clasp according to claim 5, wherein the strip comprises protruding edges arranged to guide the second bracelet strand, said protruding edges being positioned in the vicinity of the first end of the strip.

7. A wristwatch including a bracelet provided with a bracelet clasp according to claim 1.

8. A bracelet clasp comprising a strip, a first end whereof is hinged to a first end of a first bracelet strand, and the second end of the strip is free, said strip having a cut-out forming at least a rigid portion and two opposing deformable portions, each comprising a hook arranged to engage with each of a plurality of holes in a second bracelet strand and to lock the clasp on said second strand, simultaneous pressures exerted on the deformable portions resulting in the unlocking of the clasp, wherein each hook comprises a semi-cylindrical pin provided with a hook at a distal end thereof to engage the hole in the second bracelet strand and lock the clasp in the second bracelet strand.

9. The bracelet clasp according to claim 8, wherein the strip comprises a loop for guiding the second bracelet strand, the loop being placed in the immediate vicinity of the free end of the strip.

10. The bracelet clasp according to claim 8, wherein the strip comprises machined edges to form push-pieces and facilitate the deformation of the deformable portions.

11. The bracelet clasp according to claim 8, wherein the rigid portion of the strip comprises a pin arranged to engage with a further hole in the second strand.

12. The bracelet clasp according to claim 8, wherein the strip is made of a material selected from: plastic materials, metals and metal alloys, bioceramics, and composite materials.

13. The bracelet clasp according to claim 12, wherein the strip is made of two materials selected from: plastic materials, metals and metal alloys, bioceramics, and composite materials.

14. The bracelet clasp according to claim 13, wherein the strip comprises protruding edges arranged to guide the second bracelet strand, said protruding edges being positioned in the vicinity of the first end of the strip.

15. A wristwatch including a bracelet provided with a bracelet clasp according to claim 8.

* * * * *